United States Patent Office 3,227,626
Patented Jan. 4, 1966

3,227,626
PLASMINOGEN HEAT STERILIZATION
Werner Baumgarten, North Hills, and Mary-Elizabeth S. Paulonis, Frackville, Pa., assignors to Merck & Co., Inc., Rahway, N.J., a corporation of New Jersey
No Drawing. Filed Sept. 18, 1961, Ser. No. 138,557
5 Claims. (Cl. 195—66)

This invention relates to the preparation of plasminogen for clinical use, and particularly to a process for its sterilization. This process involves pasteurizing plasminogen solutions under conditions where the hepatitis virus, which may be present, is destroyed without affecting the yield of plasminogen to an adverse degree.

Plasminogen is present in human blood and can be isolated from human plasma by the procedure of Cohn employing cold ethanol fractionation (procedure described in "The Proteins," Vol. 2, 1954, pages 663–754, edited by Neurath and Bailey, published by Academic Press). Plasminogen is found most abundantly in Cohn's Fraction III. It can be further purified by various procedures such as by the subfractionation procedure of Cohn which yields Fraction III–3. Either Fraction III, or Fraction III–3 (the preparation of which is described in "The Proteins" supra), or other preparations containing a similarly high concentration of plasminogen prepared by any other method can be employed as the source of plasminogen in the process of this invention.

Plasminogen is also known as profibrinolysin. It is the precursor of the inactive form of plasmin (also known as fibrinolysin). Its most important use is for conversion to plasmin by its combination with known activators such as streptokinase, urokinase and chloroform. Plasmin is used for the treatment of acute thromoboembolic disorders as it enzymatically lyses blood clots. For this purpose the plasmin may be injected directly into the thrombus itself or it may be given intravenously.

Unfortunately, plasminogen may be contaminated with hepatitis virus because of the possibility that the virus was present in the blood of the donor. It has been estimated that approximately 1% of the population are carriers of this virus in the endemic state. A person receiving plasminogen or the plasmin made therefrom may therefore contract hepatitis. The presence of the virus cannot be determined by any known procedure. Either the plasminogen or the plasmin derived from it must therefore be sterilized in such a way as to ensure that this virus is destroyed.

Most experience has been gained in the past with the sterilization of albumin solutions and other fractions prepared from human plasma by the above-mentioned procedures of Cohn. Albumin solutions have been pasteurized for 10 hours at 60° at pH 6.9±0.5 and acetyl-troptophane and sodium caprylate have been employed as stabilizers. Attempts have been made to sterilize plasminogen preparation by similar methods but it was found that the enzymatic activity of plasminogen was completely destroyed under these conditions. It was established, however, that plasminogen solution could be heated for 10 hours at 60° if the pH was adjusted to 3.5. Under these conditions, only a fraction of the total activity could be recovered. Obviously, treatment of plasminogen at a low unphysiological pH is undesirable, and furthermore the losses on heating are great and at times reproducible yield are not obtained.

It was therefore desirable to discover conditions under which heat sterilization could be carried out at a more neutral pH. In accordance with the present invention, plasminogen solutions can be sterilized by the methods known to kill hepatitis virus without materially reducing the plasminogen activity if certain environmental conditions are established. Generally considered, this invention requires heating an aqueous solution of plasminogen to which lysine had been added. In particular, the plasminogen is dissolved in water to a concentration of between 20 and 0.25 mg. per ml. but preferably between 5 and 0.25 mg. per ml. This solution is to contain a lysine concentration of between 0.1 and 0.5 M and preferably 0.25 M. The pH of the solution is then adjusted to between 5.3 and 7.5 but preferably to a pH of about 6.5 to 6.7.

The pH of the plasminogen preparation can be adjusted with any mineral or organic acid commonly employed such as dilute hydrochloric acid, sulfuric acid, acetic acid, and the like, although for all practical purposes, hydrochloric acid is preferred. Or an alkali such as sodium hydroxide or potassium hydroxide may be used. The solution then is heated for ten hours at 60° C. and this sterilization is preferably effected in a closed vessel in a heated water bath, although other suitable apparatus can be used as well.

The sterilized plasminogen preparation thus obtained can be used directly for therapy or it can be used for the preparation of plasmin. Or, the plasminogen can be dried by lyophilization, and then, after being reconstituted with water, be used directly or be converted into plasmin. As the virus has been destroyed the danger of transmitting hepatitis is removed.

The effect upon plasminogen activity by variations in (a) the plasminogen concentration, (b) lysine concentration, and (c) pH, which are contemplated by the invention is determined by converting it into plasmin through the action of streptokinase and measurement of the plasmin formed by observing the lysis of a standard fibrin clot. For example, the assay procedure for plasmin which is used may be that described in Vox Sanguinis 5: 416–424 (1960). The data obtained by these variations are listed in Table A. The plasminogen preparations were prepared by dissolving Fraction III–3, obtained by the Cohn procedure described in "The Proteins" supra, in sufficient aqueous lysine solution to provide the mg./ml. concentrations specified in the Table A. Sufficient hydrochloric acid or sodium hydroxide was added to adjust the solution to the pH shown and the solutions then were sterilized by heating in a water bath for 10 hours at 60° C. The control sample is an aliquot sample of Fraction III–3 which was not subjected to sterilization. Test samples were taken from each of the other preparations following sterilization.

TABLE A
[Heat sterilization of plasminogen solutions. Influence of protein concentration. Lysine concentration and pH]

| Concentration of— | | Concentration of Plasminogen in units/ml. after heating at pH | | | |
|---|---|---|---|---|---|
| Plasminogen in mg./ml. | Lysine in M | Before heating | 5.5 | 6.5 | 7.5 |
| 10 | 0.1 | 23,000 | 8,400 | -------- | 6,000 |
| 10 | -------- | 20,000 | -------- | -------- | -------- |
| 10 | 0.1 | 39,700 | 9,400 | -------- | 8,400 |
| 10 | -------- | 30,000 | -------- | -------- | -------- |
| 5 | 0.1 | 39,000 | 7,400 | -------- | 7,500 |
| 1 | 0.1 | 7,400 | 3,000 | -------- | 3,200 |
| 1 | -------- | 8,200 | -------- | -------- | -------- |
| 5 | 0.1 | 33,400 | 9,000 | -------- | -------- |
| 2.5 | 0.1 | 15,390 | 3,800 | -------- | -------- |
| 1.0 | 0.1 | 7,200 | 2,000 | -------- | -------- |
| 0.5 | 0.1 | 3,000 | 1,000 | -------- | -------- |
| 2.5 | 0.05 | 18,900 | 900 | 700 | -------- |
| 2.5 | 0.1 | 19,000 | 3,100 | 3,100 | -------- |
| 2.5 | 0.55 | 15,100 | 5,600 | 7,600 | -------- |
| 2.5 | 0.25 | 33,800 | 15,000 | 20,000 | 14,300 |
| 1.0 | 0.25 | 13,800 | 6,300 | 7,000 | 5,500 |
| 2.5 | 0.1 | 34,600 | 8,200 | 8,200 | 5,200 |
| 1.0 | 0.1 | 14,000 | 2,800 | 3,300 | 3,800 |

It is an additional feature of our invention that if plasminogen is heated at pH 5.5 in lysine solution that a precipitate is formed. This precipitate consists of non-plasminogen proteins which may be considered as contaminants of the plasminogen preparation. This precipitate can be removed after heating and a highly-purified plasminogen preparation results.

The invention will be explained further by the following illustrative examples:

*Example 1*

250 mg. of Fraction III-3 are dissolved in 100 ml. of 0.25 M lysine solution. The mixture is centrifuged to remove insoluble material and the pH of the supernatant is adjusted to pH 5.5. The solution is heated for 10 hours at 60° C. in a closed vessel in order to reduce loss of volume by evapoartion. The solution is cooled and a precipitate which had been formed is removed by centrifugation. The supernatant may be dried by lyophilization or may be directly converted into plasmin upon the addition of streptokinase.

*Example 2*

500 mg. of Fraction III-3 are dissolved in 200 ml. of 0.25 lysine solution and the solution clarified by filtration through a sterile S-6 pad in a Horman filter. The pH of the solution is adjusted to 6.5 and the solution is heated for 10 hours at 60° C. in a closed vessel. Upon completion of the heating cycle, the solution can be lyophilized to prepare plasminogen solid or may be converted into plasmin by the addition of streptokinase.

*Example 3*

500 mg. of Fraction III-3 is dissolved in 100 ml. of water and solution clarified either by filtration or centrifugation. To the supernatant is added a solution of 100 ml. of 0.5 M lysine and the resulting mixture is heated for 10 hours at 60° C. in a closed vessel.

What is claimed is:

1. The method of sterilizing plasminogen which comprises heating at 60° C. for 10 hours an aqueous preparation having a lysine molar concentration of from 0.1 to 0.5, a plasminogen content of from 0.25 to 20 mg. per ml., and a pH of from 5.3 to 7.5.

2. The method of sterilizing plasminogen which comprises heating at 60° C. for 10 hours an aqueous preparation having a lysine molar concentration of from 0.1 to 0.5, a plasminogen content of from 0.25 to 5 mg. per ml., and a pH of from 5.3 to 7.5.

3. The method of sterilizing plasminogen which comprises heating at 60° C. for 10 hours an aqueous preparation having a lysine molar concentration of 0.25, a plasminogen content of from 0.25 to 20 mg. per ml., and a pH of from 5.3 to 7.5.

4. The method of sterilizing plasminogen which comprises heating at 60° C. for 10 hours an aqueous preparation having a lysine molar concentration of from 0.1 to 0.5, a plasminogen content of from 0.25 to 20 mg., per ml. and a pH of from 6.5 to 6.7.

5. The method of sterilizing plasminogen which comprises heating at 60° C. for 10 hours an aqueous preparation having a lysine molar concentration of 0.25, a plasminogen content of from 0.25 to 5 mg. per ml., and a pH of from 6.5 to 6.7.

References Cited by the Examiner

UNITED STATES PATENTS

| | | | |
|---|---|---|---|
| 2,897,123 | 7/1959 | Singher | 167—74 |
| 2,939,817 | 6/1960 | Nagasawa et al. | 167—78 |
| 3,066,079 | 11/1962 | Hagan et al. | 167—74 |

OTHER REFERENCES

Remmert et al., J. Biological Chem., vol. 181, November-December 1949, pp. 431–47, especially page 437.

Troll et al., J. Biological Chem., vol. 213, March-April 1955, pp. 881–91, especially pp. 886–7.

JULIAN S. LEVITT, *Primary Examiner.*

MORRIS O. WOLK, FRANK CACCIAPAGLIA, JR., LEWIS GOTTS, *Examiners.*